(12) United States Patent
Zucker

(10) Patent No.: US 8,705,726 B2
(45) Date of Patent: *Apr. 22, 2014

(54) FAX MESSAGING FOR NEW USERS

(75) Inventor: Nehemia Zucker, Encino, CA (US)

(73) Assignee: j2 Global Communications, Hollywood, CA (US)

( * ) Notice: Subject to any disclaimer, the term of this patent is extended or adjusted under 35 U.S.C. 154(b) by 340 days.

This patent is subject to a terminal disclaimer.

(21) Appl. No.: 13/194,446

(22) Filed: Jul. 29, 2011

(65) Prior Publication Data

US 2011/0286363 A1 Nov. 24, 2011

Related U.S. Application Data

(63) Continuation of application No. 11/200,635, filed on Aug. 9, 2005, now Pat. No. 7,990,950.

(51) Int. Cl.
*H04L 12/66* (2006.01)

(52) U.S. Cl.
USPC ..................................... 379/352; 379/100.01

(58) Field of Classification Search
USPC ..................................... 370/352; 379/100.01
See application file for complete search history.

(56) References Cited

U.S. PATENT DOCUMENTS

| | | | |
|---|---|---|---|
| 4,058,672 A | 11/1977 | Crager et al. | |
| 4,994,926 A | 2/1991 | Gordon et al. | |
| 5,291,302 A | 3/1994 | Gordon et al. | |
| 5,675,507 A | 10/1997 | Bobo, II | |
| 6,564,193 B1 | 5/2003 | Shore et al. | |
| 6,615,187 B1 | 9/2003 | Ashenmil et al. | |
| 6,693,729 B1 | 2/2004 | Bloomfield | |
| 7,054,929 B2 | 5/2006 | Irie et al. | |
| 2002/0019792 A1 | 2/2002 | Maerz et al. | |
| 2002/0107976 A1 | 8/2002 | Irie et al. | |
| 2006/0294208 A1 | 12/2006 | Adams et al. | |

OTHER PUBLICATIONS

PCT International Search Report (dated Mar. 7, 2007), International Application No. PCT/US06/30290—International Filing Date Aug. 1, 2006, (10 pages).
Final Office Action (dated Oct. 13, 2009), U.S. Appl. No. 11/200,635, filed Aug. 9, 2005, First Named Inventor: Nehemia Zucker, (10 pages).
11200635_20090223, Non-Final Rejection_http_web.archive.org_web_20020929174817_www.maxemail_4.pdf (http://web.archive.org/web/20020929174817/www.maxemail.com/), Sep. 29, 2002, (6 pages).
Non-Final Office Action (dated Mar. 3, 2009), U.S. Appl. No. 11/200,635, filed Aug. 9, 2005, First Named Inventor: Nehemia Zucker, (11 pages).
Non-Final Office Action (dated Feb. 19, 2010), U.S. Appl. No. 11/200,635, filed Aug. 9, 2005, First Named Inventor: Nehemia Zucker, (11 pages).
Final Office Action (dated Jul. 26, 2010), U.S. Appl. No. 11/200,635, filed Aug. 9, 2005, First Named Inventor: Nehemia Zucker, (11 pages).
Non-Final Office Action (dated Oct. 13, 2010), U.S. Appl. No. 11/200,635, filed Aug. 9, 2005, First Named Inventor: Nehemia Zucker, (12 pages).
Final Office Action (dated Oct. 13, 2009), U.S. Appl. No. 11/200,635, filed Aug. 9, 2005, First Named Inventor: Nehemia Zucker, (10 pages).
CA Examiner's Report (dated Sep. 26, 2013), Application No. 2622898, Date Filed—Aug. 1, 2006, (4 pages).

*Primary Examiner* — Simon Sing
(74) *Attorney, Agent, or Firm* — Blakely, Sokoloff, Taylor & Zafman LLP

(57) ABSTRACT

Send and receive services are operated that send and receive fax messages, respectively, via fax protocols. Each new customer is offered a predetermined amount of the receive service, and a more limited amount of the send service, both free of charge to the customer, as part of a group of services that includes Internet access, Web services, or Internet telephony. Other embodiments are also described and claimed.

21 Claims, 5 Drawing Sheets

FAX MESSAGING FOR NEW USERS

RELATED MATTERS

This application is a continuation of Ser. No. 11/200,635, filed Aug. 9, 2005, entitled "Fax Messaging for New Users" (pending).

An embodiment of the invention is directed to operating fax messaging services. Other embodiments are also described and claimed.

BACKGROUND

Fax messaging continues to be an important avenue for easy delivery of secure messages between individuals worldwide. Fax messaging continues to be important, despite the proliferation of data services that use the Internet. The send and receive fax messaging services operated by j2 Global Communications of Hollywood, Calif., are appropriate examples. With the j2 Send service, a fax message is transmitted through the public switch telephone network via fax protocol, on behalf of a subscriber to the service. Typically, a user that subscribes to the service is instructed to attach a document that is to be faxed to an email message, and address the email message to a j2 Global domain name, with the destination fax number as the prefix. This email is then sent, from the user's Internet connected computer, to the j2 Global internal network where it is converted and then transmitted as a fax transmission. This is also referred to as an outbound service.

Fax messaging services may also include an inbound (or receive) service, such as j2 Receive, where a subscriber is assigned a unique, direct inward dial (DID) telephone number which the user distributes to others who may wish to send a fax to the user. This telephone number is in effect the user's individual fax number. When an incoming fax is received at a particular DID number, the j2 Global internal network converts the received fax transmission into a format that is compatible with an email protocol. An image file containing the received fax image is attached to an email that is then sent to the subscriber's email address. The subscriber may then access her email account, select the email that includes a received fax, detach the image file and display the file on her Internet connected computer to view the received fax transmission.

The promotion of such fax messaging services have until now been quite limited in their approach.

BRIEF DESCRIPTION OF THE DRAWINGS

The embodiments of the invention are illustrated by way of example and not by way of limitation in the figures of the accompanying drawings in which like references indicate similar elements. It should be noted that references to "an" embodiment of the invention in this disclosure are not necessarily to the same embodiment, and they mean at least one.

DETAILED DESCRIPTION

Figure 1:
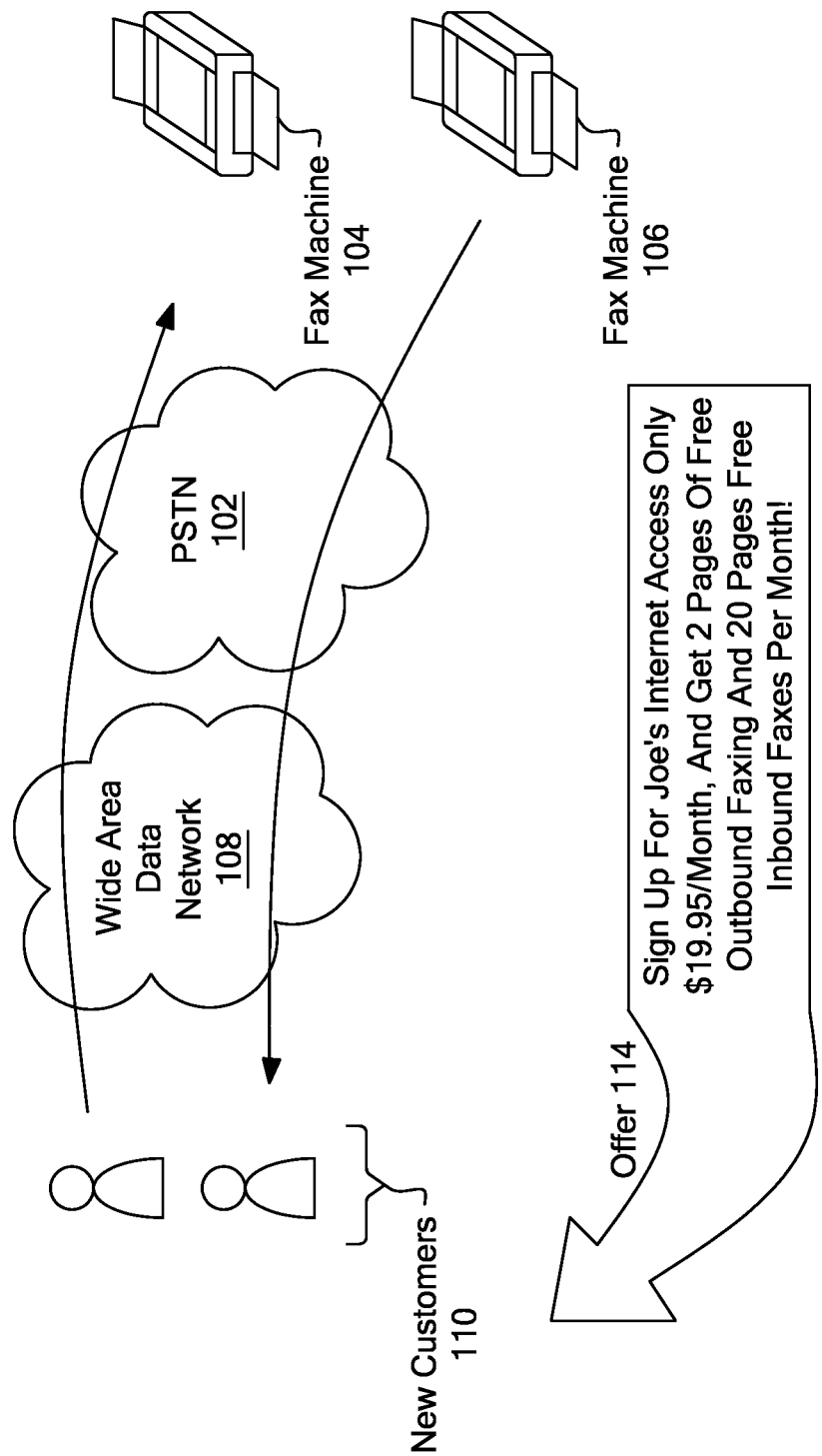
FIG. 1 shows a conceptual block diagram of promoting fax messaging services, according to an embodiment of the invention.

FIG. 1 shows a conceptual block diagram of promoting fax messaging services according to an embodiment of the invention. Send and receive services are operated that send and receive fax messages, respectively. Examples of such send and receive fax messaging services are those operated by j2 Global Communications of Hollywood, Calif. For example, conventional fax protocols (such as the Group 3 protocol defined by the Comite Consultatif Internationale Telephonique et Telegraphique/International Telecommunications Union, CCITT/ITU) may be used that transmit electronic versions of documents through the public switched telephone network (PSTN) to a fax machine 104, or receive from a fax machine 106. The fax machine 104, 106 may be a stand alone, dedicated fax transmission and reception device, or it may be integrated with a general purpose computer or server, having a fax modem, for example. The documents to be faxed are obtained from a customer of the service, through a wide area data network, or simply wide area network, WAN 108, such as the Internet or another network that uses routers to forward packets from one network to another. Incoming faxes are sent to the customer also via the WAN 108.

A method according to an embodiment of the invention includes offering to each of a number of new customers 110 a predetermined amount of the receive service, and a more limited amount of the send service. These offers are made together and are free of charge to the customer, as part of a group of services that includes, for example, Internet access, Web services, or Internet telephony. The example offer 114 in FIG. 1 requests that the new customer signup for Joe's Internet access service, for a certain amount per month, and in return receive two pages of free outbound faxing and twenty pages of free inbound faxes per month. Of course, the exact number of pages that are free for either the send or receive service, as well as the monthly subscription charge for the Internet access service, can vary over a wide range. The amounts are only specified in this case merely to give an easier explanation for the concept. Also, the offer 114 may, as an alternative or in addition to Internet access, include other types of communications services that use a wide area network, such as Web services and Internet telephony. Although the manner in which the offer is presented may be controlled by one party and not the other, the offering is deemed from both the provider of the fax send and receive services, as well as the provider of the other services.

Figure 3:
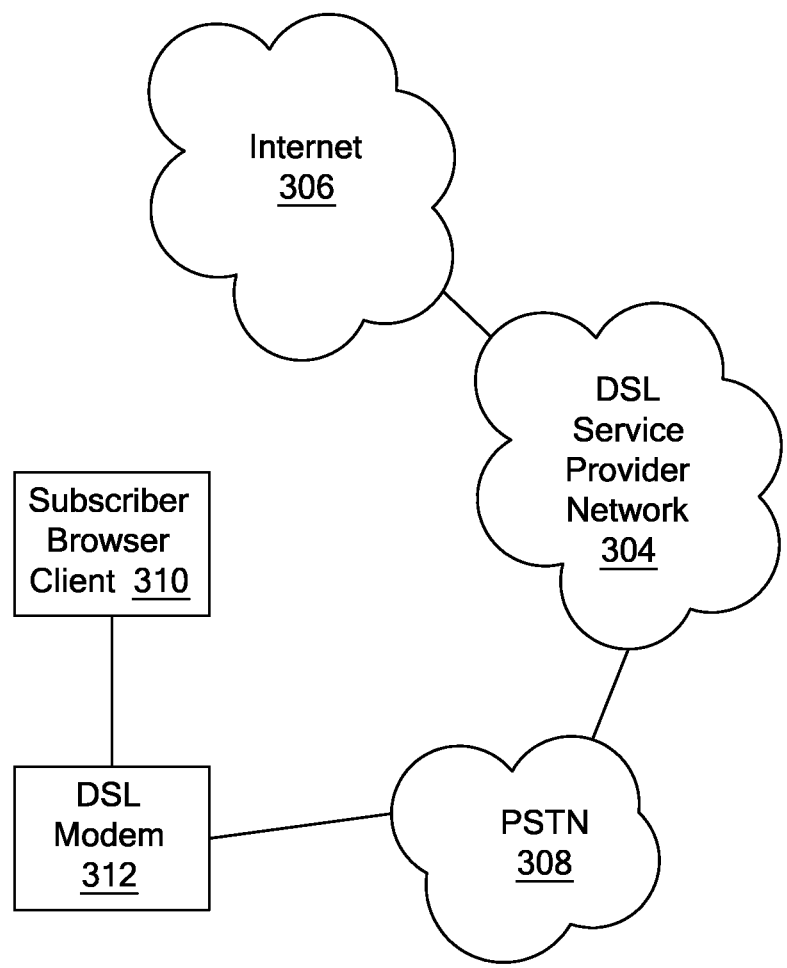
FIG. 3 illustrates the concept of providing digital subscriber line (DSL) Internet services to a subscriber.

FIG. 3 depicts the concept of providing conventional, digital subscriber line (DSL) Internet services to a subscriber. Such services may be provided by a DSL service provider having a network that is connected to the Internet 306 on the one hand, and to the PSTN 308 on the other. The subscriber is given access to the Internet via a high speed connection, using a subscriber browser client (application program) 310 running on any suitable end user, computing platform, and via a DSL modem 312. Examples of such Internet access or Internet service providers include Earthlink, Inc. who currently provides dialup and high speed DSL services, as well as wireless email and voice with Blackberry devices, Treo Smart Phones, laptop cellular, and laptop Wi-Fi devices. The latter services are collectively referred to here as wireless data services. Another example of an Internet access provider is SBC Communications, Inc. of San Antonio, Tex., that provides high speed Internet services, wireless Internet, wireless phone, and long distance and local voice services. The offer 114 could be made by any one of such entities, bundling a certain amount of the fax receive service with a more limited amount of the fax send service, both free of charge, to new customers of its Internet access service.

Figure 4:
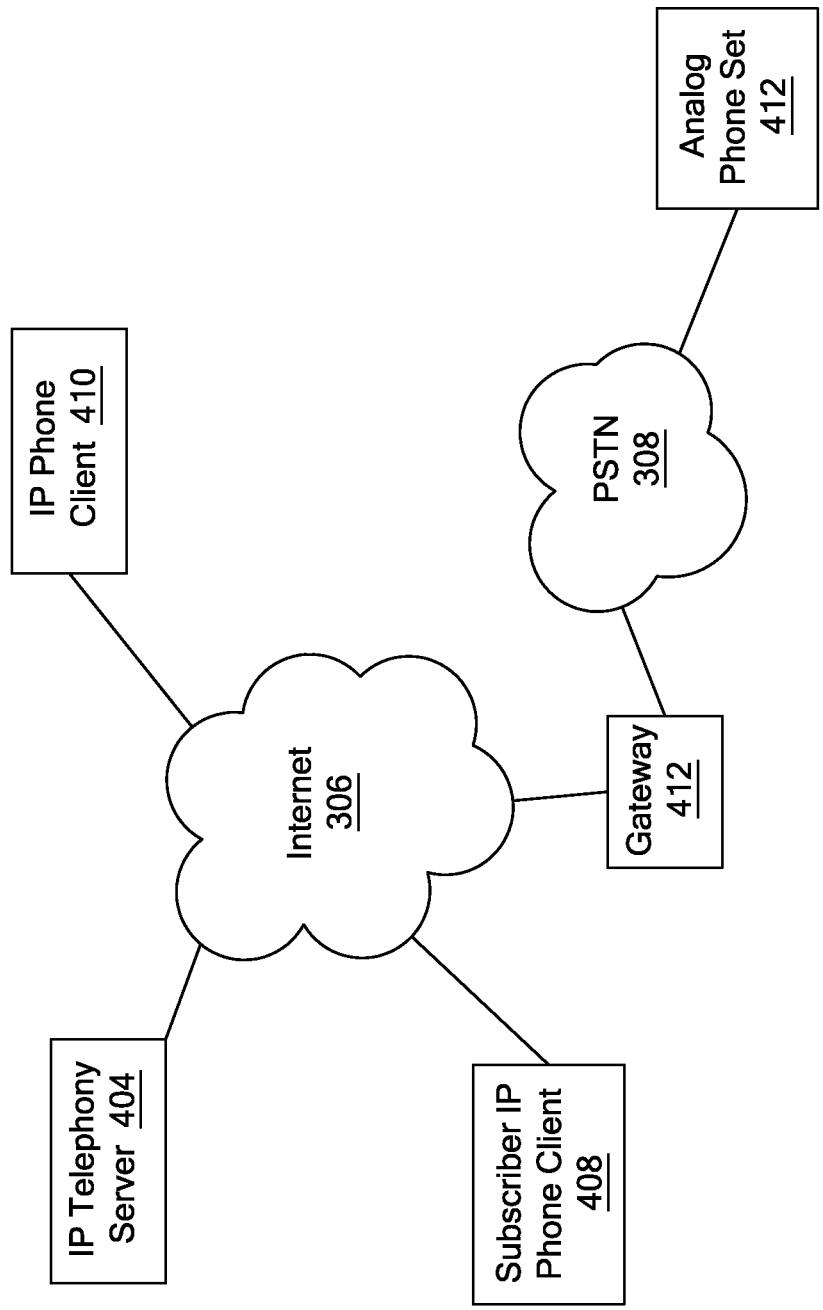
FIG. 4 shows the concept of providing Internet Protocol (IP) telephony services.

FIG. 4 shows the concept of providing Internet Protocol (IP) telephony services. The service provider in this case would have an IP telephony server 404 that communicates, via the Internet 306, with a subscriber IP phone client 408, to enable a two-way live conversation through a packet-switched network. This allows the subscriber to talk to another person who is using an IP phone client 410, or one that is using a conventional analog phone set 412 via the PSTN 308 and IP-PSTN gateway 412. The service is also referred to as voice over IP (VOIP), or short for voice over Internet Protocol, which encompasses a category of hardware and software that enables people to use the Internet as the transmission medium for telephone calls, by sending voice data in packets using IP rather than by traditional, circuit switched transmissions of the PSTN. Currently, one advantage of IP telephony is that the telephone calls over the Internet do not incur a surcharge, beyond what the user is paying for Internet access (similar to the way that the user does not pay for sending individual emails over the Internet). Examples of subscriber IP phone clients 408 include applications such as CoolTalk and NetMeeting which come bundled with popular web browsers. Others are stand-alone application programs. The offer 114 could be made by any one of a number of IP telephony service providers, bundling a certain amount of the fax receive service with a more limited amount of the fax send service, both free of charge, to new, individual or institutional customers of its IP telephony service.

Figure 5:
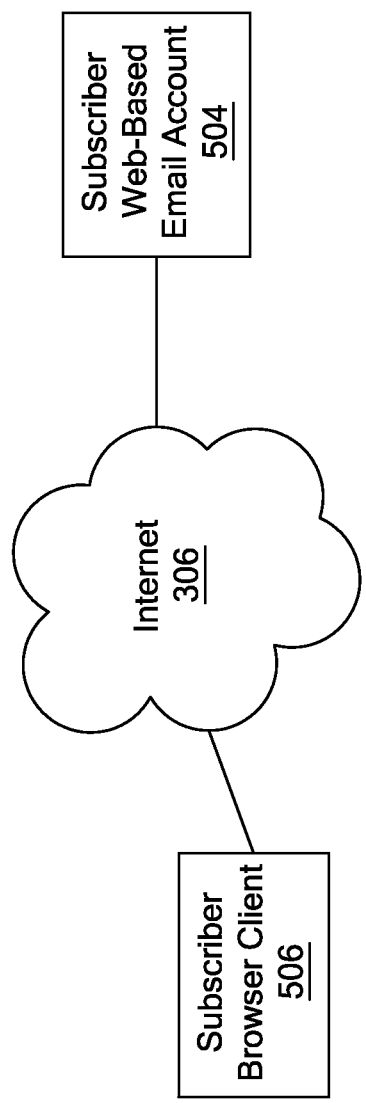
FIG. 5 depicts the idea of providing Web-based email services.

FIG. 5 depicts the idea of providing Web-based email services, which is another communication service that can be bundled with the fax send and receive services in the manner described above. In FIG. 5, a Web-based subscriber email account 504 is supported by a provider of such services. Access to this account is again via the Internet 306, with the subscriber using a browser client 506 to access the services. Such web services may be provided by a Web portal that provides Web-based email (e.g., Yahoo!, Yahoo!Mail, and MSN Hotmail). A Web portal which is commonly referred to as simply a portal, has a web site or service that offers a broad array of resources and services including not just e-mail, but also discussion forums, search engines, and in some cases on-line shopping malls. Early Web portals were on-line services such as AOL that provided access to the web, however currently most of the traditional search engines have also transformed themselves into Web portals to attract and keep a larger audience (e.g., Google, Inc.). The offer 114 could be made by any one of a number of such Web service providers, bundling a certain amount of the fax receive service with a more limited amount of the fax send service, both free of charge, to new, individual or institutional customers of its Web service.

The send and receive services on the one hand, and the Internet access, Web, or Internet telephony service on the other may be administered by different entities. For example, j2 Global may be selected to use its hardware and software technology to implement the capability of converting a received message from the new customer into a fax protocol format and transmitting the converted message to its destination (e.g., in a telephony network such as the PSTN). A different entity in that case, such as Earthlink, Yahoo!Mail, or SBC, would administer the network of servers that, for example, communicate with a DSL modem on the new subscriber's premises, control authentication for access to an email account in storage, or manage a connection for an IP telephone call.

As to the offer 114, this can be made on a web site that is administered on behalf of, and advertises one or more services of the Internet access, Web, or Internet telephony services provider. The offer 114 may also be via an email marketing campaign of the service provider that targets existing customers of the service provider that have not yet signed up for additional services. For example, a provider that has a number of existing customers using its conventional voice telephony service may want to target those customers as part of an email campaign that offers a paid subscription to the provider's high speed Internet access service. This offer may be advantageously bundled with j2 Global's Send and Receive fax services in the manner described above (e.g., a certain number of free inbound fax pages, and a fewer number of outbound fax pages, both free of charge during a predetermined time interval, e.g, every month). Other ways of making the offer 114 are possible, including, for example, print ads in general circulation newspapers and magazines. The offer could also be made on a web site or in a marketing campaign that is administered by the entity that administers the fax send and receive services, e.g. j2 Global, to new customers.

Figure 2:
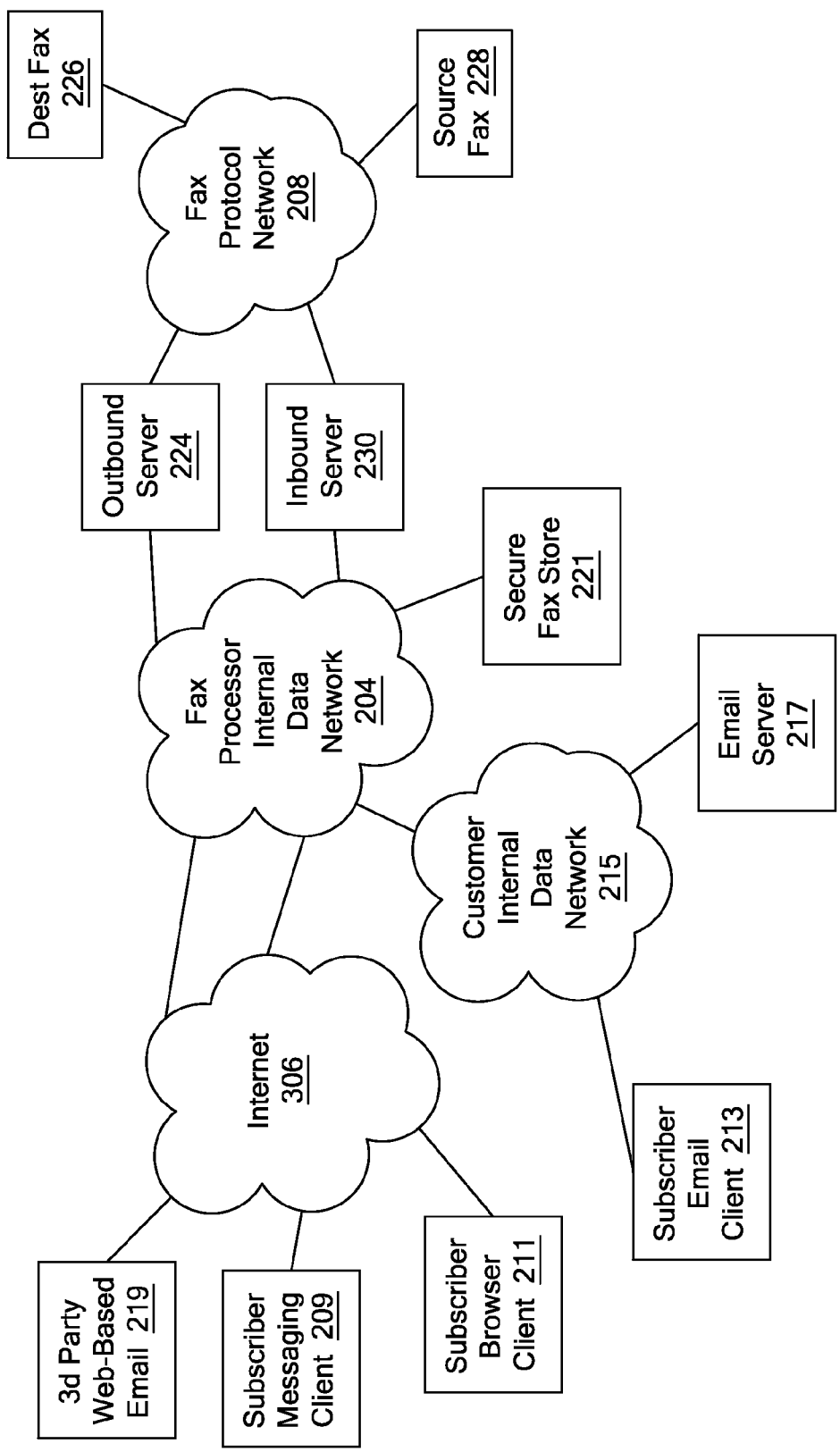
FIG. 2 is a network environment containing a fax processor, in accordance with an embodiment of the invention.

Referring now to FIG. 2, a network environment containing a fax processor that can provide fax send and receive services, in accordance with an embodiment of the invention, is shown. The fax processor has an internal data network 204 that acts as an interface between subscriber/client applications on one side and destination and source fax machines on the other. The subscriber/client in this case could include anyone of the following: a subscriber messaging client 209 (e.g., eFax Messenger for Microsoft Windows or MacIntosh operating systems, by j2 Global), a browser client 211 (e.g., Safari by Apple Computer, Inc.), and email client 213 (e.g., Lotus Notes by IBM Corp.). The fax processor may also be designed to work with other client applications not listed here. Such client applications use the Internet 306 to access different storages for files that contain inbound or received fax messages. For example, the email client 213 will access through, in this example, a customer internal data network 215, an email server 217. Inbound faxes would be delivered to the email server 217 from the fax processor internal data network 204, and may be stored there until accessed by the email client 213.

As to the browser client 211, that may be used to access a third party Web-based email web site 219, also over the Internet 306. Files received from the fax processor would be stored by the third party network, until selected to be downloaded by use of the browser client 211. The browser client 211 may also request, via a web site of the fax processor (not shown), that received, fax files be downloaded from a secure fax store 221 that is part of the fax processor's internal data network 204. In that case, a special authentication and authorization procedure may be instituted by the fax processor, to ensure that fax files stored in the secure fax store 221 can only be accessed by the authorized and authenticated parties.

In some cases, whether the file is downloaded via the browser client 211 or via the email client 213, the fax processor may wish to provide each of its subscribers a messaging client 209 that has special capabilities for decoding inbound fax files that have been downloaded.

The same client applications used for opening and viewing received fax files may also be used to send a fax message from a subscriber to the fax processor, for subsequent conversion and transmission over a fax protocol network 208. For example, an email message may be composed by the subscriber and sent using her email client 213, or her browser client 211 (in the latter case via the third party Web-based email service) addressed to an email address of the fax processor. The message received by the fax processor may be an attachment to an email message that has been addressed to a domain name of an operator of the send service. This may be in the form of ### . . . ###@domain_name, where ### . . . ### is a fax number or address of a destination in the fax protocol network 208. When the fax processor has received such a message from a customer of the send service (where the message in this case is sent by the customer or subscriber from an external packet network and received in the internal data network 204), the customer's account may be identified (e.g., based on the "From:" field of the email message). The fax processor then verifies that there is permission to use the send service (by inspecting the customer's account that is on file with it), and converts the received message into a fax protocol format. The converted message is then transmitted to its destination in the fax protocol network 208 (e.g., destination fax machine 226). This fax protocol network 208 may be a telephony network, such as the PSTN. In the example shown here, the transmission of the converted message over the fax protocol network 208 is done by an outbound server 224 of the internal data network 204. To provide a global reach, there may be numerous outbound servers 224 geographically dispersed worldwide, such that an email message from a subscriber in Los Angeles, addressed to a destination fax machine located in Tokyo, is performed by an outbound server that is physically located in Tokyo.

With the receive service, a fax message is received that is addressed to a customer of the receive service. The fax message is received via fax protocol, over the fax protocol network 208 and originally transmitted by a source fax machine 228. The initial capture of an incoming fax receive message in the example of FIG. 2 is made by an inbound server 230 that may have an interface to a telecommunications switch (not shown) for a number of DID lines that have been assigned to respective customers of the receive service. Although not shown, the internal data network 204 may also have a central database server that stores the fax processor's customers' accounts. The processor verifies with the customer's account, on file with the fax processor in its internal data network 204, that there is permission to use the receive service. To locate the relevant customer account, different techniques may be used. For example, the inbound fax number or address may be a DID number that has been assigned to a single customer, and not others, for receiving fax and/or voice messages left for the customer. The fax processor would then look up the status of the customer's account using this DID number that has been detected when the inbound fax is being received over it.

The fax processor converts the received fax message into an electronic messaging protocol format that is used for messaging in packet data networks that are connected by routers (e.g., the Internet 306). The converted message is then sent to an address of the subscriber in a wide area network such as the Internet (this address may also be part of the customer's account on file with the fax processor). For example, an email may be sent to the subscriber's email address, including the received fax message in the form of an attached image file.

According to an embodiment of the invention, the fax processor initializes a data structure that is associated with a new user, within the internal packet data network, for example, for storage in its database server, to indicate that a predetermined number of fax pages can be transmitted for that subscriber. In addition, the data structure will indicate that a greater number of fax pages can be received for that subscriber. The data structure will also indicate that those pages are to be transmitted and received at no charge to the subscriber, if the newly added subscriber is also a new user of an Internet access service, a Web service, or Internet telephony service of a provider that has contracted with the fax processor for promoting its services.

An embodiment of the invention may be a machine readable medium having stored thereon instructions which program a machine to perform some of the operations described above, e.g. operating send and receive services and offering to new customers a combination of a certain amount of the receive service with a more limited amount of the send service free of charge. In other embodiments, some of these operations might be performed by specific hardware components that contain hardwired logic. Those operations might alternatively be performed by any combination of programmed computer components and custom hardware components.

A machine-readable medium may include any mechanism for storing or transmitting information in a form readable by a machine (e.g., a processor, a computer; a network of computers), not limited to Compact Disc Read-Only Memory (CD-ROMs), Read-Only Memory (ROMs), Random Access Memory (RAM), Erasable Programmable Read-Only Memory (EPROM), and a transmission over the Internet.

The invention is not limited to the specific embodiments described above. For example, the fax protocols may evolve over time and differ from the conventional Group 3 (PSTN) and Group 4 (ISDN) versions described above. Accordingly, other embodiments are within the scope of the claims.

What is claimed is:

1. A method comprising:
    operating, by a first service provider, a computer system to provide send and receive services that send and receive fax messages, respectively, via fax protocols; and
    providing, by the first service provider to a second service provider the capability of transmitting a message to each of a plurality of new customers of the second service provider, wherein the message identifies a predetermined amount of the send service, receive service, or both, free of charge to the new customer, as part of a group of services that includes one of Internet access, Web, and Internet telephony services provided by the second service provider, wherein the first and second service providers are distinct entities and the message is to be transmitted to each new customer by the second service provider to promote the services of the first service provider.

2. The method of claim 1 wherein operating the computer system to provide the send service comprises the machine-implemented operations of:
    receiving a message from a customer of the send service, the message having been sent by the customer from an external packet network and received in an internal packet network; verifying with the customer's account that there is permission to use the send service; and converting the received message into a fax protocol format and transmitting the converted message to its destination.

3. The method of claim 1 wherein operating the computer system to provide the receive service comprises receiving a fax message that is addressed to a customer of the receive service via a fax protocol, verifying with the customer's account that there is permission to use the receive service, and converting the received fax message into an electronic messaging protocol format used for messaging in packet data networks that are connected by routers.

4. The method of claim 2 wherein the received message is an attachment to an email message that has been addressed to a domain name of the first service provider, in the form of ### . . . ###@domain_name where ### . . . ### is a fax number of the destination.

5. The method of claim 2 wherein verifying, for permission to use the send service comprises using an email address of the customer to look up a status of the customers account.

6. The method of claim 3 wherein verifying for permission to use the receive service comprises using a DID number of the customer to look up a status of the customer's account.

7. The method of claim 1 wherein the message transmitted by the second service provider to promote the services of the first service provider is on a Web site that is administered on behalf of the second service provider.

8. The method of claim 1 wherein the message transmitted by the second service provider to promote the services of the first service provider is transmitted via an email marketing campaign of the second service provider.

9. A machine-implemented method of operating a fax processor, comprising:
    transmitting a fax message by a first service provider on behalf of a user, in response to receiving within an internal packet data network a request from the user from an external packet data network;
    receiving a fax message by the first service provider on behalf of the user into the internal packet data network, and enabling the user to view the received fax message from the external packet data network; and
    initializing in the internal packet data network a data structure by the first service provider that is associated with a new user to indicate that a predetermined number of fax pages can be transmitted, a predetermined number of fax pages can be received, or both, as free services of the first service provider for the new user where the new user is also a new subscriber to one of an Internet access service, a Web service, and an Internet telephony service provided by a second service provider, wherein the first and second service providers are distinct entities and the first service provider provides the capability to the second service provider to transmit a message to the new user to promote the services of the first service provider.

10. The method of claim 9 further comprising:
    prior to transmitting the fax message, verifying within the internal packet data network that the user has permission to transmit faxes using the fax processor and then converting an outbound message from the user into a fax protocol format.

11. The method of claim 10 where the outbound message is an attachment to an email message that has been addressed to a domain name of the fax processor, in the form of ### . . . ###@domain_name where ### . . . ### is a fax number of a destination of the transmitted fax message in a fax protocol network.

12. The method of claim 9 wherein receiving a fax message comprises receiving the fax message via an incoming call to a telephone number assigned only to the user and not other users of the fax processor.

13. The method of claim 9 wherein the request is received via an email message that is addressed to an email address having the format ### . . . ###@domain_name where ### . . . ### is a telephone number of a destination fax machine and domain_name is a domain name of the first service provider.

14. A computer system for providing fax messaging, comprising:
    a plurality of programmed computer components administered by a first service provider that send and receive fax messages via fax protocols to provide send and receive services to a user, and in which is stored a data structure that is associated with a new user of the send and receive services, wherein the data structure indicates that a predetermined number of fax pages can be transmitted, a predetermined number of fax pages can be received, or both, as a free service to the new user where the new user is also a new subscriber of one of an Internet access service, a Web service and an Internet telephony service provided by a second service provider, wherein the first and second service providers are distinct entities and the first service provider provides the capability to the second service provider to transmit a message to the new user to promote the services of the first service provider.

15. The computer system of claim 14, wherein the plurality of programmed computer components are to receive a message from a customer of the send service, the message having been sent by the customer from an external packet network and received in an internal packet network of the first service provider, verify with the customers account that there is permission to use the send service, and convert the received message into a fax protocol format and transmit the converted message to its destination.

16. The computer system of claim 14, wherein the plurality of programmed computer components receive a fax message that is addressed to a customer of the receive service via a fax protocol, verify with the customers account that there is permission to use the receive service, and convert the received fax message into an electronic messaging protocol format that is used for messaging in packet data networks that are connected by routers.

17. The computer system of claim 15, wherein the received message is an attachment to an email message that has been addressed in the form of ###@domain_name where ### is a fax number of the destination.

18. The computer system of claim 15, wherein the plurality of programmed computer components use an email address of the customer to look up a status of the customers account, when verifying for permission to use the send service.

19. The computer system of claim 16, wherein the plurality of programmed computer components use a DID number of the customer to look up a status of the customers account, when verifying for permission to use the receive service.

20. The computer system of claim 17, wherein the domain_name is a domain name of the first service provider.

21. The computer system of claim 16, wherein the fax message is received via an incoming call to a telephone number assigned only to the customer and not other customers of the first service provider.

* * * * *